United States Patent [19]

Massie

[11] 3,885,551

[45] May 27, 1975

[54] ARTIFACT REJECTION FOR BLOOD PRESSURE MONITORING

[75] Inventor: Harold Lee Massie, Hightstown, N.J.

[73] Assignee: Hoffmann-La Roche Inc., Nutley, N.J.

[22] Filed: July 19, 1973

[21] Appl. No.: 380,805

Related U.S. Application Data

[63] Continuation of Ser. No. 130,422, May 1, 1971, abandoned.

[52] U.S. Cl. .................. 128/2.05 A; 128/2.05 Z
[51] Int. Cl. .................................................. A61b 5/02
[58] Field of Search..... 128/2.05 A, 2.05 M, 2.05 P, 128/2.05 Q, 2.05 R, 2.05 T, 2.06 F, 2.06 R

[56]            References Cited
              UNITED STATES PATENTS

| 3,171,892 | 3/1965 | Pantle | 128/2.05 R |
| 3,605,723 | 9/1971 | King et al. | 128/2.05 Z |
| 3,623,476 | 11/1971 | Robillard | 128/2.05 M |
| 3,651,798 | 3/1972 | Egli et al. | 128/2.05 M |

*Primary Examiner*—William E. Kamm
*Attorney, Agent, or Firm*—Samuel L. Welt; Bernard S. Leon; Mark L. Hopkins

[57]              ABSTRACT

Apparatus for automatically implementing indirect blood pressure measurement with transducer means for deriving and developing electrical signals in response to the interaction of blood pressure and cuff pressure under a varying external pressure capable of occluding an artery, and detector means for analyzing the electrical signals in terms of pulse width and rate for detection and rejection of artifact signals.

8 Claims, 10 Drawing Figures

ARTIFACT REJECTION FOR BLOOD PRESSURE MONITORING

CROSS-REFERENCE TO RELATED APPLICATION

This is a continuation of application Ser. No. 130,422 filed Apr. 1, 1971 entitled ARTIFACT REJECTION FOR BLOOD PRESSURE MONITORING, and now abandoned.

BACKGROUND OF THE INVENTION

1. Field of the Invention

This invention relates broadly to indirect blood pressure measurement, and, more particularly, to a method and apparatus for automatically implementing an indirect blood pressure measurement technique which provides for an automatic capability of distinguishing valid signals from artifact signals.

2. Description of the prior art

The standard clinical technique for indirect blood pressure measurement is the estimation of intra-arterial pressure by "Korotkoff" sounds. This includes placement of the familiar pressure cuff about a body limb, such as an arm, containing the artery in question. The functioning of this technique, commonly referred to as the Korotkoff method, calls for initially inflating the pressure cuff to a level exceeding the peak intra-arterial blood pressure so as to cut off blood flow, and then slowly deflating the cuff to diminish the pressure while listening to the presence and/or absence of downstream audible sounds which are understood, for numerous articles, to result from blood turbulence flowing from the constricted segment of the artery when cuff pressure decreases below peak intra-arterial pressure over a series of successive cardiac cycles. These audible sounds are normally detected by use of a stethoscope or microphone. By simultaneously observed cuff pressure and listening to the audible sounds, the operator may estimate systolic and diastolic blood pressure values of a particular patient.

Other approaches include the use of strain gauges, analyzing impedances changes, etc. Another approach, as is exemplified in the particular embodiment of the present invention, is basically directed to detecting wall motion of the arterial segment constrictable under occlusive pressure during the phase of rapid transition of the wall between open and closed configurations.

Common to all of these techniques or approaches, is the problem of providing for more precise measurements and measurements which are relatively free from artifact. Although the wall motion approach briefly referred to above, is relatively free from ambient noise, problems are incurred with arm motion artifacts or tissue and muscle motion artifacts.

Unfortunately, in any such system in which the human body plays a role, the body generates its share of artifact signals that often are not easily distinguished from those signals bearing the desired information. These problems are further increased where machines are used for automatically processing signals, simply because a machine cannot discern the differences in the signals as readily as a human ear might and, thus, artifacts are not so easily rejected. Accordingly, in machine processing systems, artifacts often affect machine readings to give unreliable blood pressure data. The artifact signals, have been found to mainly occur in lower frequency signals which unfortunately lie in the band of frequencies recognized as blood pressure signals. In utilizing an ultrasonic doppler ultrasonic technique filters are employed to discriminate against the lower frequency artifact signals, but since at systole low frequency signals are significant, some decrease in sensitivity is the result. This, of course, is unacceptable especially for hypotensive cases.

OBJECTS AND SUMMARY OF THE INVENTION

It is, therefore, an object of the invention to provide an improved indirect blood pressure measurement system for automatically detecting more precise and accurate blood pressure values by automatically detecting and rejecting signals indicative of artifacts.

In accordance with the invention, logic circuitry is used to detect artifact signals and separate them from valid signals by analyzing the pulse width and pulse rate of each of the incoming pulses and comparing each with standards or a normal which is indicative of a valid signal. A period or "window" of specific time duration is established in which the pulse width and rate tests are utilized.

Further aspects of the present invention call for an alarm system signifying occurrence of a valid artery pulse within a minimum prescribed millimeter drop of maximum cuff pump-up pressure to indicate that possibly the cuff has not been pumped-up high enough above the patient's systolic pressure.

GENERAL

Although the present invention will be described with utilization of a continuous wave doppler effect ultrasonic exploratory unit, most aspects of the invention can be readily applied to most any blood pressure monitoring system which employs a pressure cuff and transducer arrangement, irrespective of whether the transducer is e.g. of the ultrasonic, microphone or strain gauge type and as·to the ultrasonic type irrespective of whether it employs e.g. range-gated or phase-coded techniques.

Monitoring the behavior of the arterial wall under cuff pressure with a doppler ultrasonic exploratory unit which basically is a motion detection system, might be best described with reference to FIG. 1 wherein there is shown a series of successive arterial pressure waves 11 and a dashed line 12 representation of cuff pressure as it is decreased within an inflated cuff about a subject's arm from a pump-up pressure valve selected to exceed the expected systolic pressure.

In briefly reviewing the operation of a doppler ultrasonic exploratory unit, as the cuff occluding pressure approximates systolic pressure at 13 the arterial wall will momentarily open and close at a slow velocity, as represented by doppler signal 13' produced due to the acute angle intersection of the decreased cuff pressure as it crosses the intra-arterial pressure wave representation. A further decrease of cuff pressure will intersect the successive arterial pressure wave at point 14 at a less acute angle and its effect on the artery will cause an opening event depicted by doppler signal 14' at a much higher velocity. In the same manner, intersection of a successive arterial pressure wave along its steep slope at point 15 will cause a very abrupt opening of the artery as indicated by the high velocity opening even depicted by doppler signal 15'. It may be seen then that in many instances, lower velocity doppler signals will be observed at systolic and high velocity doppler signals observed after systole. However, this is not always the case as, for example, in shock cases where arterial wall velocities will be slower than those in high blood pressure cases. An advantage of the doppler ultrasound technique is that information from stationary objects is ignored whereas signals are obtained from moving structures only. The doppler shift signal is at an audio frequency which is proportional to the instantaneous velocity of the reflecting target's motion with respect to the transmitting ultrasonic transducer. Additional discrimination in favor of signals from the desired targets and against unwanted signals may be obtained by virtue of the highly directional characteristics of ultrasound.

DESCRIPTION OF THE PREFERRED EMBODIMENT

Figure 2:
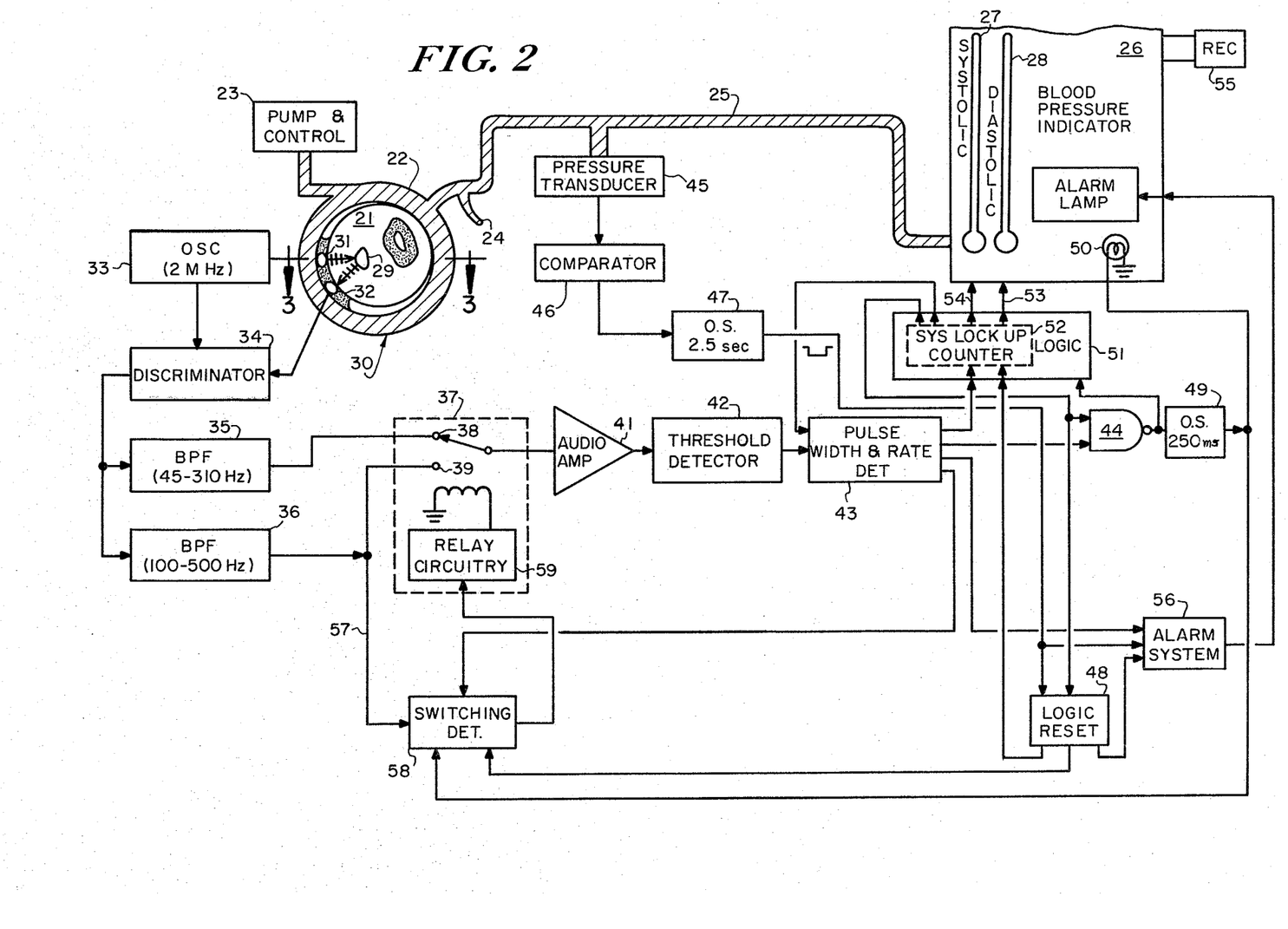
FIG. 2 is a schematic representation of a preferred embodiment of the present invention utilizing ultrasonic doppler techniques for monitoring blood pressure values.
Figure 3:
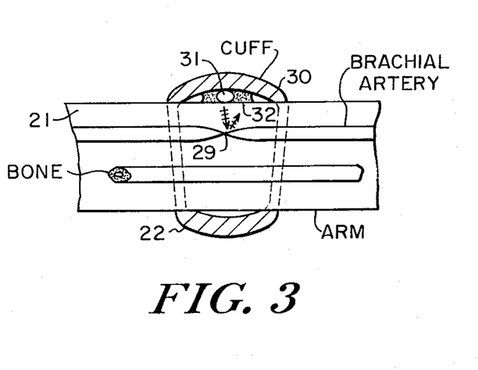
FIG. 3 is a cross section of an arm taken along the line 3–3' in FIG. 2 to illustrate how an artery wall in a body is investigated for detecting arterial wall movement.

With reference to the drawings there is shown in FIGS. 2 and 3 a representation of an upper arm 21 of a subject encircled by the conventional pneumatic cuff 22 inflatable by a suitable pump and control unit 23. A typical pneumatic system employed for occluding the brachial artery might include a conventional automated electro-pneumatic system (not shown) to rapidly inflate and then gradually deflate the cuff such as by a relief valve 24, allowing air from the cuff to be bled off at a uniform rate subsequent to attaining a sufficiently high predetermined cuff pressure. Tubing 25 connects the cuff with an indicator unit 26 including a pair of manometers 27, 28 for respectively displaying a patient's systolic and diastolic blood pressure values.

Placed underneath the cuff and in contact with the arm is an ultrasonic transducer assembly 30 used in detecting arterial wall movements about artery segment 29 to be occluded. The particular transducer assembly illustrated comprises a pair of piezoelectric crystals 31, 32, one crystal 31 used with a radio frequency oscillator 33 for radiating a beam of 2 MHz ultrasonic energy toward the artery segment 29 environed by the cuff, and the second crystal 32 employed for receiving the ultrasonic energy reflected from arterial segment 29 and converting the received energy into an electrical signal. Separate transmitting and receiving crystal elements are depicted in describing the invention, however, it should be understood that a common receiving and transmitting element may be readily employed.

The receiver crystal in the present embodiment is coupled to a discriminator 34 for detecting the resulting low deviation frequency and phase modulated signals associated with the doppler shift produced by the artery wall movement. The discriminator is then connected to each of two suitable band pass filters 35, 36 which may be of the passive or active type. When using a 2 MHz oscillating frequency, filter 35 is designed to pass low frequency audio signals. The filter 35 has a bandwidth of about 45 Hz to approximately 300 or 400 Hz at 3 db with a reference point of odb at 100 to 200 Hz. The filter has an attenuation of 21 db per octave at the lower side and a minimum of 12 db per octave attenuation at the high side. Filter 36 is designed to pass signals having frequency content at A3 db point of 100 Hz to 500 Hz with a minimum attenuation of 18 db per octave at the low side. The output lead of filter 35 is connected to the initially closed contact 38 of a relay switch 37, whereas the filter 36 output lead is connected to the open contact 39. Connected from the output side of relay switch 37 is an audio amplifier 41 coupled to an adjustable threshold detector 42. The digital output of threshold detector 42 is connected to the pulse width and rate detector 43, which output in turn is connected with the input of a NAND gate 44.

Connected at a point along tubing 25 is a pressure transducer 45 for sensing and converting the existing pressure in the cuff to an analogous electrical signal. The pressure transducer is coupled to a differential comparator 46 for detecting at what point the cuff has been inflated to a maximum predetermined pressure prior to deflating the cuff. A one shot multivibrator 47 is connected from comparator 46 to a second input of NAND gate 44. When triggered by the leading edge from comparator 46, one shot multivibrator 47 will generate a signal having a pulse width of e.g. 2½ seconds. The 2.5 second one shot pulse is employed as an inhibition pulse to NAND gate 44 to prevent false triggering by either the pump motor or the cuff adjusting to the air pressure, and is aslo connected to a logic reset unit 48.

The output of NAND gate 44 is connected to a one shot multivibrator 49 and thence to indicator unit 26. When triggered, one shot multivibrator 49 generates a 250 ms pulse energizing lamp 50 to give a momentary visual indication whenever a doppler signal resulting from arterial wall motion is present. The output of NAND gate 44 is also connected through logic circuitry 51, which includes a systolic lock-up counter 52, for controlling the systolic and diastolic manometers 27, 28 through leads 53 and 54 respectively, to set the pressure level of the manometers at the measured systolic and diastolic pressure points of the subject. If desired, a recorder 55 may be connected to indicator 26 to provide a record of digital and/or analog information representative of blood pressure. An alarm system 56 is connected from outputs of the pulse width and rate detector 43, one shot unit 47 and logic reset unit 48, and connected to an alarm reset lamp on indicator 26.

With reference back to the output of filter unit 36, a branch lead 57 is connected to a switching detector circuit 58, utilized for monitoring signals passed by the 100 cycle band pass filter and responding to certain events for actuating relay circuitry 59 of relay switch 37. Switching detector 58 is also connected from logic reset unit 48, one shot unit 49 and pulse width and rate detector 43.

SWITCHING DETECTOR

Figure 4:
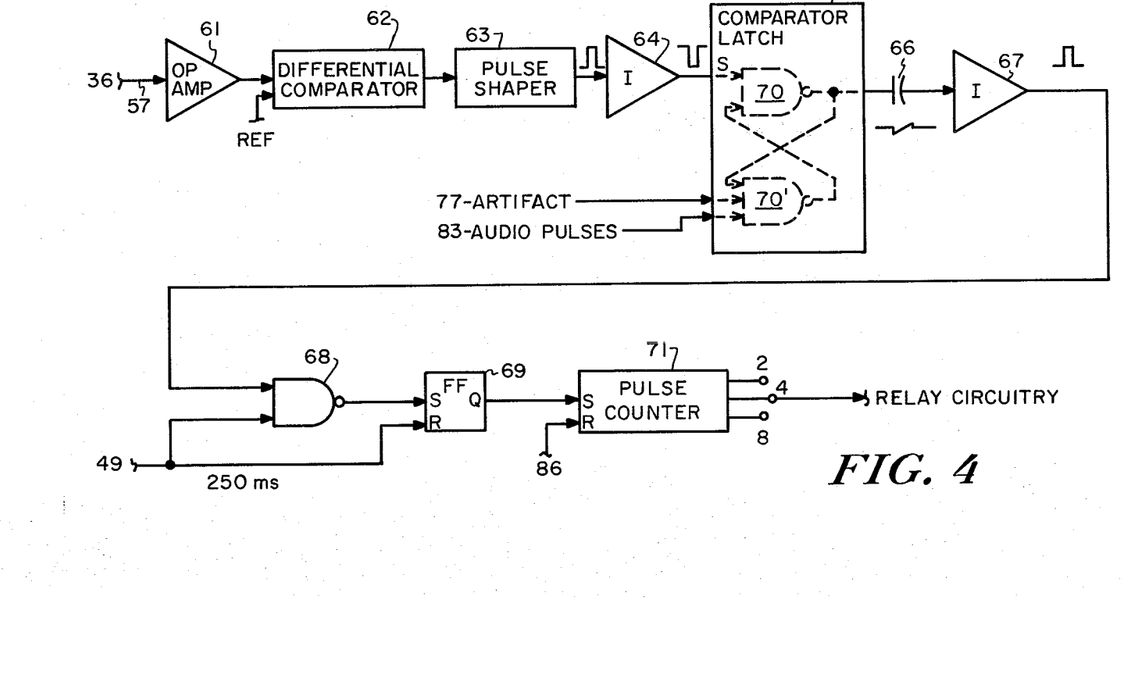
FIG. 4 is a more detailed schematic representation of the switching detector 58 of FIG. 2.

Illustrated in FIG. 4 is a block diagram of switching detector 58 wherein the input lead to switching detector 58 is coupled to an operationl amplifier 61 to present a stable DC signal level at one input of a comparator 62 with artery AC signals riding on it. The second input to comparator 62 is a DC threshold adjustable reference level. The threshold setting determines the artery signal amplitude criterion for actuating the comparator to drive a pulse shaper 63, which, via an inverter 64, feeds the set input of a comparator latch 65 that is also fed at its reset input from pulse width and rate test unit 43 with both artifact pulses and valid artery pulses. As shown the, comparator latch 65 comprises a pair of NAND gates 70 and 70'. A pulse output from inverter 64 causes NAND gate 70 to go high, whereby upon arrival of either an artifact or artery pulse NAND gate 70' will go high causing an output pulse and resetting the comparator latch, thus acting as an artery or artifact comparator with the 100 Hz pulse from the shaper. An output pulse from comparator latch 65 will momentarily discharge capacitor 66 to provide an output pulse from inverter 67. NAND gate 68 will be enabled upon coincidence of such a pulse and the 250 ms signal period of O.S.49 which is only triggered by an artery pulse. A flip flop unit 69 is triggered by the NAND gate 68 output and reset by the negative portion of the 250 ms pulse. The output of flip flop 69 is fed to the set input of pulse counter 71.

Counter 71 includes sufficient flip flop units for recording successive pulse signals generated by the setting of the flip flop 69. When, for example, four of the patient's valid artery (audio) signals have a 100 Hz content of sufficient magnitude, the output of the counter will go low to trigger the relay circuitry 59 including the conventional relay latch and driver, thus causing the relay switch 37 to contact terminal 39 in lieu of terminal 38, thereby allowing 100 Hz filtered pulses to be processed in the blood pressure measuring logic.

PULSE WIDTH AND RATE DETECTOR

Figure 5:
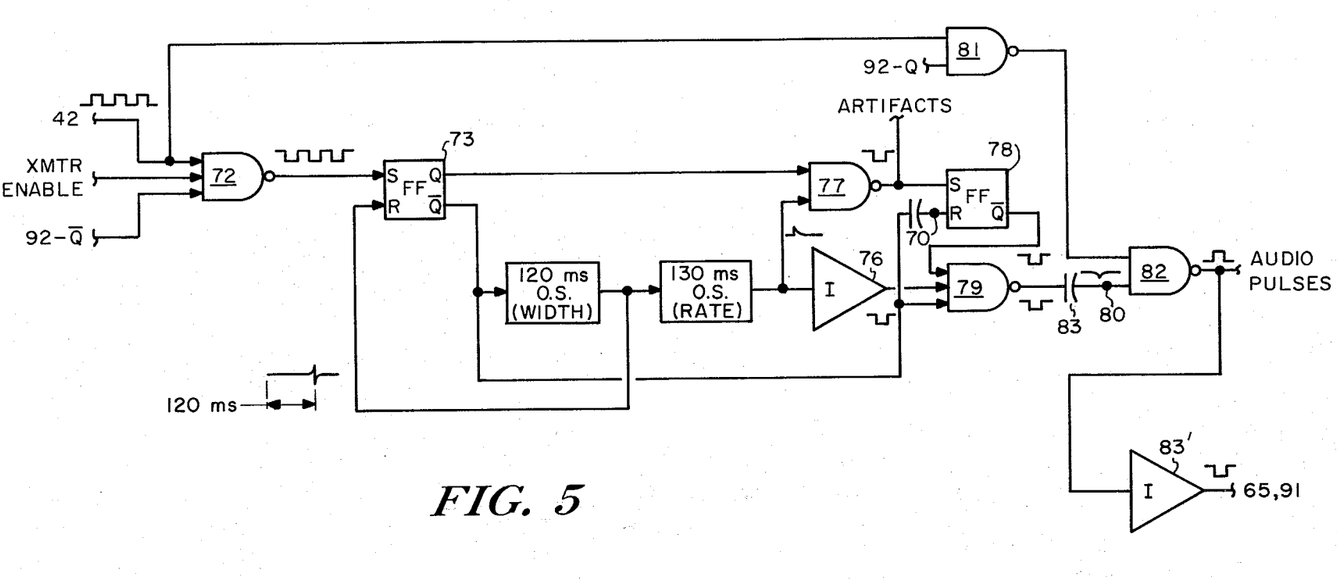
FIG. 5 is a more detailed schematic representation of the pulse width and rate detector 43 of FIG. 2.

With reference to FIG. 5, there is shown a pulse width and rate detector unit 43 having a NAND gate 72 fed by inputs from: threshold detector 42; a transmitter 33 enable signal; and, a signal from circuitry hereinafter to be described in FIG. 9 which signal changes state when a count of four valid artery pulses has been made. NAND gate 72 is connected to the set input of flip flop 73 which $\overline{Q}$ output is connected to a 120 ms one shot multivibrator 74 and thence back to the reset input of flip flop 73 and to a 130 ms one shot multivibrator 75, which latter unit in turn is connected to inverter 76 and one input of NAND gate 77. NAND gate 77 is also connected from the Q output of flip flop 73 and is connected to the set input of flip flop 78, the $\overline{Q}$ output of which is connected to one input of NAND gate 79 which is also connected from inverter 76 and the $\overline{Q}$ output of flip flop 73. Also, the $\overline{Q}$ output of flip-flop 73 is coupled via capacitor 70 to the reset input of flip-flop 78. NAND gate 81 is connected from threshold detector unit 42 and is provided with a second input indicative of four valid artery pulses having been counted, to be hereinafter described with reference to FIG. 9. A NAND gate 82 is connected from NAND gate 81 and from NAND gate 79 via capacitor 83, to provide an output indicative of audio pulses. An inverted output of this is also provided via inverter unit 83'.

In review, the first doppler or audio signals passing through NAND gate 72 will set flip flop 73 to trigger one shot unit 74 for 120 ms at the end of which period flip flop 73 is reset and one shot unit 75 is triggered for 130 ms to, in effect, provide a "window" during the latter portion of a 250 ms period in which the width of the doppler signal as well as its rate is analyzed. Since it has been found that the maximum possible pulse width or duration of a normal artery doppler pulse is approximately 100 ms, the 120 ms duration will include such pulse width but will discriminate against motion artifact pulses exceeding the 120 ms width. It has also been found that if a second doppler pulse is received within the 130 ms window which is within a 250 ms period, it, i.e. the first or initial pulse, is most likely artifact and, if the second pulse falls within the "window", the first pulse will be considered an artifact in view of the rate being too fast, since the maximum rate expected is 240 beats per minute of any individual. Thus, a first pulse cannot be determined as valid (i.e. non-artifact) until it is followed by the absence of a succeeding pulse for the time duration defined by the window.

The logic operation may be readily explained with reference to FIG. 6, where a first output pulse 84 from the comparator NAND gate 72 output sets flip flop 73 to trigger one shot 74 generating 120 ms pulse the trailing edge of which triggers one shot 75 to generate a 130 ms pulse, as illustrated. Upon presence of a second doppler pulse 85 within the 130 ms window and during the 250 ms period, flip-flop 73 is again triggered to provide a positive pulse of similar duration at flip flop 73 Q output. The Q output of flip flop 73 and the 13o ms pulse from one shot 75 will overlap or coincide to enable NAND gate 77, automatically signifying pulse 85 as being an artifact pulse based upon the pulse 85 occurring within 250 ms as being too fast a rate. Similarly, if an input pulse 85' extends for a duration beyond the 120 ms period, one shot 74 is retriggered causing the Q output of flip flop 73 to coincide with the 130 ms pulse to enable NAND gate 77, automatically signifying pulse 85' as being an artifact pulse based upon pulse 85' having a greater width. In each of the latter cases, where an artifact occurs, the NAND gate 77 output will set flip flop 78 to provide a negative pulse at the $\overline{Q}$ output to NAND gate 79. Due also to the polarity of signals applied to NAND gate 79 from inverter 76 and the flip flop 73 $\overline{Q}$ output, NAND gate 79 does not go low thereby failing to discharge capacitor 83 and thus prevent NAND gate 82 from going high.

Figure 7:
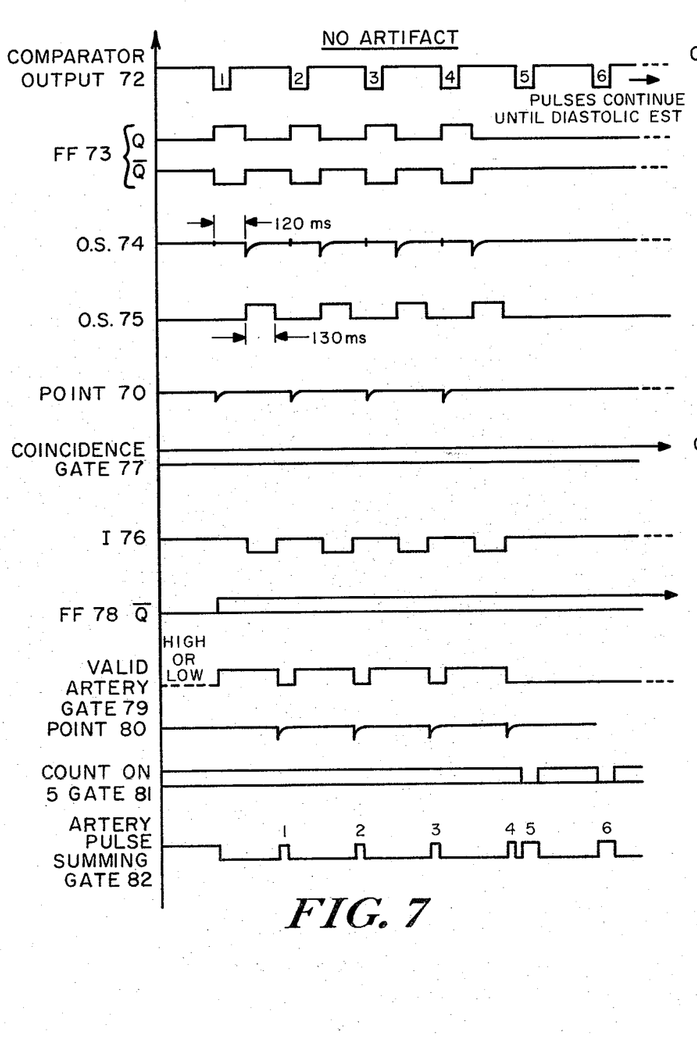

In turning to FIG. 7 where no artifacts are shown to occur, the $\overline{Q}$ output of flip flop 78 will remain high and thus when the inverter 76 output goes high and the $\overline{Q}$ output of flip flop 73 is high, NAND gate 79 is enabled to go low to temporarily discharge capacitor 83, whereby the NAND gate 82 output goes low, denoting the presence of a valid artery pulse. As is further illustrated, upon supplying NAND gate 81 with a signal from flip flop 92 (FIG. 9) to indicate that four valid artery pulses have been counted, NAND gate 81 is qualified to allow all subsequent pulses from threshold detector 42, commencing with the fifth pulse so marked, to pass through NAND gate 81 as well as NAND gate 82 to be emitted as an artery pulse. At the same time NAND gate 72 is disabled by the $\overline{Q}$ output of flip flop 92. This is feasible as artifacts are usually isolated pulses normally having a count of less than four. Accordingly, the count of four allows these isolated artifacts to be eliminated.

In addition, with reference to FIGS. 2 and 4 it will be observed that on the count of four valid artery pulses in switching detector 58, relay switch 37 is energized to, in effect, actively inject band pass filter 36 into the system whereby with the 100 Hz filter, the lower frequency artifact type signals are more easily rejected while maintaining good sensitivity at the higher 100 Hz frequency for monitoring blood pressure values.

LOGIC RESET CIRCUITRY

Figure 8:
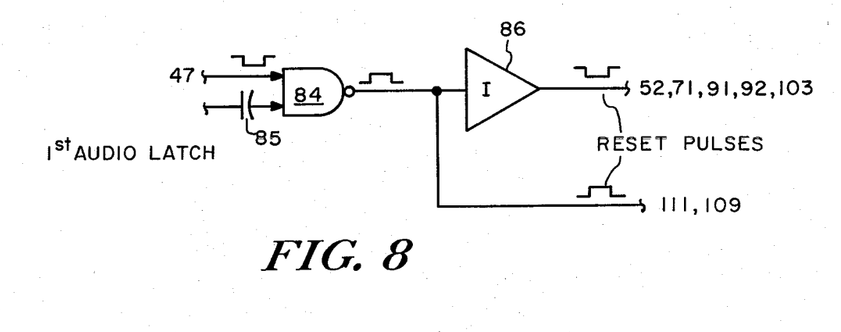
FIG. 8 is a more detailed schematic representation of the logic reset circuitry 48 of FIG. 2.

With reference to FIG. 8, logic reset circuitry 48 is shown to comprise a NAND gate 84 having a first input from the 2.5 second one shot unit 47 and the second input, via a capacitor 85, from a first audio latch (not shown) in logic unit 51, whereby such latch, which would be set high by the output of a resettable timer of predetermined duration (2½ sec, for example), is of the conventional type normally employed for temporarily locking up the systolic manometer indicator 27 in response to a first signal enabling the timer, which in the present case is an artery signal fed via NAND gate 44. Both input signals to NAND gate 84 are normally high to provide a low output. However, at each case, during the 2.5 second audio inhibit pulse and absence of a second pulse within the predetermined period of 2.5 sec NAND gate 84 goes high effecting reset. In the case of the absence of a second pulse within 2.5 sec, the timer unlocks the first audio latch to generate a pulse which is differentiated by capacitor 85, to drive the output of NAND gate 84 high. Inverter 86 inverts each of these pulses also for reset purposes.

SYSTOLIC LOCK-UP COUNTER

Figure 9:
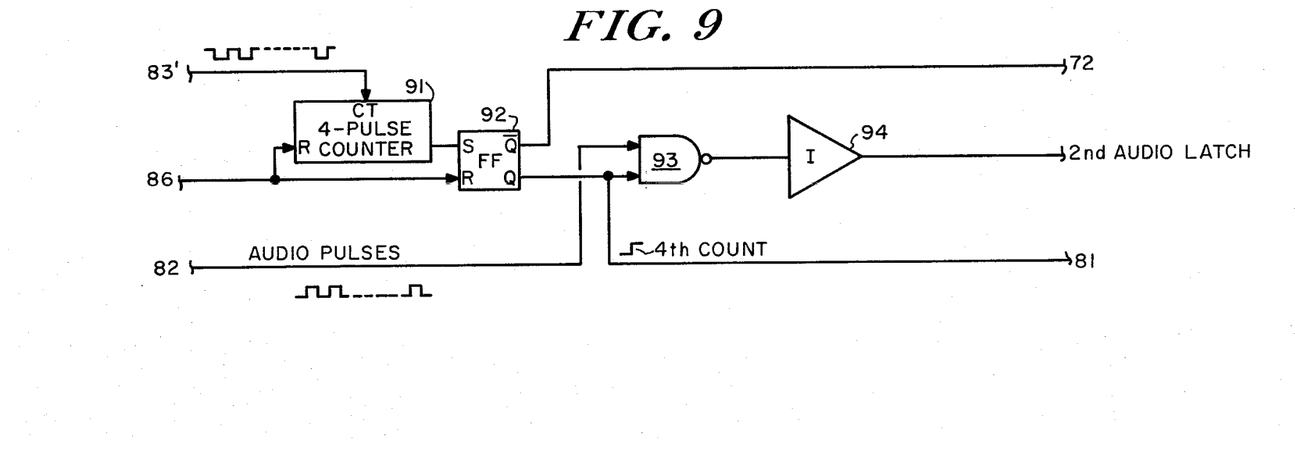
FIG. 9 is a more detailed schematic representation of the systolic lock-up counter circuitry 52 of FIG. 2.

The systolic lock-up counter 52, illustrated in FIG. 9, comprises a counter 91 adapted to count four artery pulses for systolic recognition. Its reset input is fed from inverter 86 of the reset logic 48 upon disengagement of the first audio latch and also during the 2.5 second audio inhibit pulse. Counter 91 is energized by the inverted audio pulses of the pulse width and rate detector 43. The output of counter 91 is applied to the set input of flip flop 92 which reset input is coupled from inverter 86. The triggering of flip flop 92, which functions as a systolic recognition latch, will at Q indicate an output upon the fourth count of an artery pulse which is fed to NAND gate 93 and to the count on five NAND gate 81 to FIG. 5. The Q bar output of flip flop 92 is coupled to NAND gate 72 of FIG. 5 to disable NAND gate 72 when the Q bar output goes high. Thus, in FIG. 9, after the count of four artery pulses all subsequent pulses in FIG. 5, from threshold detector 42 bypass the pulse width and rate detector 43 via NAND gate 81. NAND gate 93 is enabled at the fourth artery pulse count to pass audio pulses from NAND gate 82 at FIG. 5. The output of NAND gate 93 is connected to an inverter 94 to permanently lock-up the systolic manometer tube 27 via a conventional second audio gate latch (not shown) in logic unit 51.

ALARM SYSTEM

Figure 10:
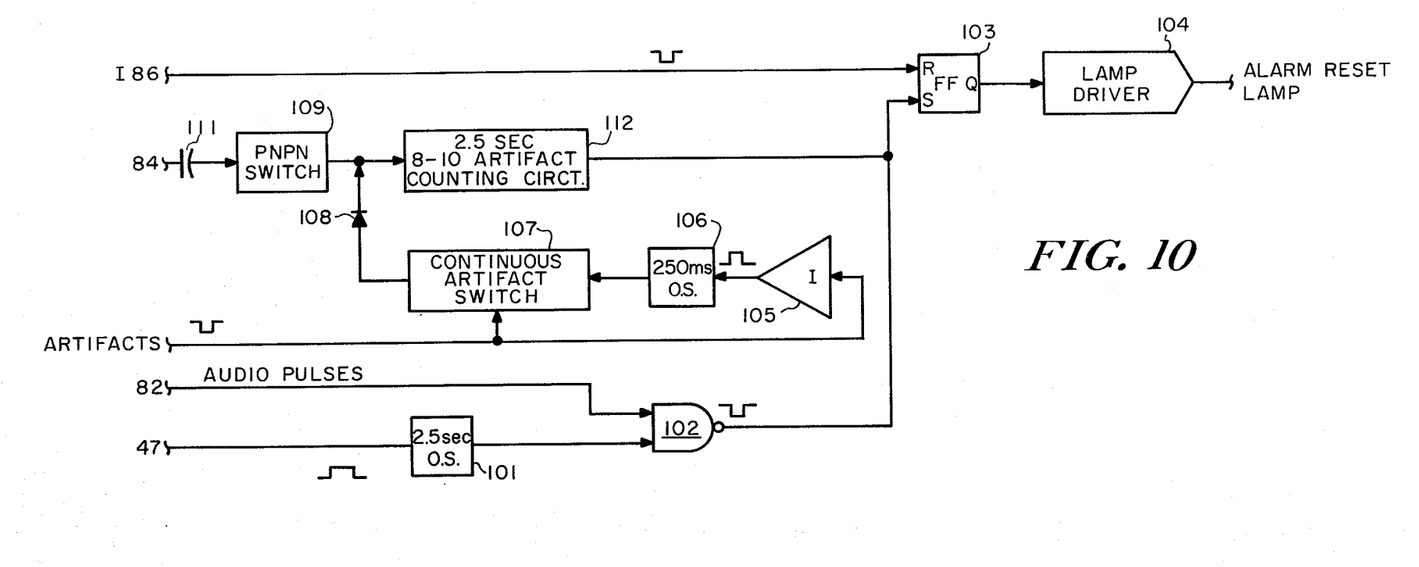
FIG. 10 is a more detailed schematic representation of the alarm system circuitry 56 of FIG. 2.

There is shown in FIG. 10 alarm system 56, comprising a one shot unit 101 which is connected from one shot unit 47 to generate at the trailing edge of the one shot unit 47, another pulse of approximate 2.5 second duration and fed to one input of NAND gate 102. The second input to NAND gate 102 is supplied by output artery pulses from NAND gate 82. Accordingly, during the second 2.5 second period occurring within 10 millimeters of the maximum pump-up of cuff pressure selected above systolic, should the first valid artery pulse then occur, NAND gate 102 is enabled to set flip flop 103 and trigger the lamp driver 104 to light the alarm reset lamp, thereby indicating that the operator did not initially pump-up high enough above the patient's systolic pressure. Therefore, the machine should be recycled with a higher cuff pressure pump-up setting.

Also illustrated in an artifact input applied to one input of a two way switch 107 and to inverter unit 105 which in turn is connected to a one shot unit 106 for counting 250 ms each time activated by a new artifact input. The one shot output is connected to a second input of the two way switch 107. Switch 107 is connected via a normally reversed biased diode 108 to the output of an PNPN switch 109 which is coupled via capacitor 111 from NAND gate 84 supplying reset pulses. Switch 107, in effect, acts as a constant current generator to provide current flow via forward biased diode 108 during the 250 ms period one shot 106 is enabled or during the entire artifact output period should the artifact signal continue for a duration beyond 250 ms. A suitable analog counting circuit 112, which counts in step-like fashion, is set to count real time for a total period of 2.5 seconds. This would either: provide a count of approximately 8 to 10 artifacts assuming each artifact activates one shot multivibrator unit 106 for 250 ms; provide an indication of continuous artifacts being applied via the artifact circuitry to switch 107; or provide some combination of the two. In any one of the latter cases, flip flop 103 is set by counter 112 to trigger lamp driver 104 and light the alarm reset lamp. Reset signals applied via capacitor 111 from NAND gate 84 will open the PNPN switch to discharge counting circuit 112. Flip flop 103 is reset via a reset pulse from inverter 86.

OPERATION

Figure 1:
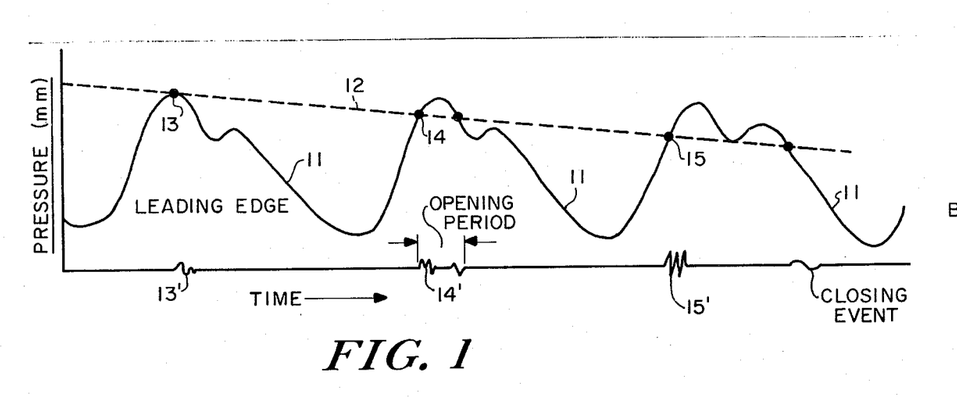
FIG. 1 is a graphic representation of blood pressure plotted versus time with an indication of occlusive pressures.

Referring now to FIGS. 1 through 3, a predetermined cuff pressure is first built up to exceed the subject's systolic pressure so as to occlude and thus expel blood from that segment 29 of the artery under the cuff. Then, as cuff pressure is decreased through relief valve 24, blood will momentarily fill artery segment 29 during systole when cuff pressure equals or is slightly less than systolic intra-arterial pressure. As cuff pressure continues to decrease, the artery segment 29 remains open for longer intervals of time as is graphically represented in FIG. 1, and finally remains open continuously when cuff pressure equals diastolic pressure.

During the above operation, a 2 MHz RF ultrasonic signal is directed to the arm by transmitting crystal 31. The reflected ultrasonic energy from moving surfaces within the arm, including those resulting from arm movements, result in doppler shifted artery signals and doppler shifted motion artifact signals, received by crystal 32, which are converted into electrical signals and applied to discriminator 34 where the deviation of the 2 MHz carrier develops difference frequencies or doppler signals indicative of the rate of modulation of the 2 MHz carrier by the artery wall movement as well as arm movements. In general, consideration as to the particular band of frequencies utilized in filters 35, 36, was established after careful investigation of artery wall velocities resulting from cuff pressure, and the rate of modulation of a 2 MHz carrier by the wall movement.

In analyzing the doppler signal, it has been found that: the amount of energy reflected by the artery wall, the excursion length of the artery wall, and the rate of deviation velocity of the arterial wall, are each to be considered. In most instances, given the same conditions, these three independent variables vary from person to person and from run to run. In a normal blood pressure measurement the characteristics of the doppler signals detected, as a result of these independent variables, are distinguishable as to amplitude and frequency so that, with proper signal processing, systolic and diastolic values may be more precisely ascertained to evaluate true blood pressure values. Accordingly, the present invention has been developed in part for first monitoring systole, and then when certain distinguishable criterion are detected in a subject's doppler signals, automatically switching or varying the initial monitoring arrangement for more accurately ascertaining subsequent blood pressure values including the diastolic blood pressure of the subject.

Separately from the above, it has also been found that in analyzing doppler artery signals vis-a-vis doppler artifact signals certain predetermined patterns have been ascertained. In particular, it has been found after extensive study that artery signals for the most part do not have pulse widths that would exceed 120 ms, nor a pulse rate that would exceed 240 beats per minute (a 250 ms period which is the maximum rate expected on any one individual). Accordingly, signals which lie outside these boundaries are not considered as true artery signals and thus are defined as artifacts and are rejected.

With reference back to FIG. 2, filter 35 will pass, with virtually no attenuation, any doppler signals having an audio frequency content of 45 Hz and higher to about 310 Hz. Below 45 Hz this filter serves to suppress extraneous arm motion, arterial wall motion not induced by cuff pressure, line transients, radiation, etc. The output of filter 35 is applied via contact 38 of relay switch 37 to audio amplifier 41 for amplification, and then at threshold detector 42 the doppler signals are amplitude discriminated from noise signals. Signals passed by threshold detector 42 are then applied to the pulse width and rate detector 43.

Figure 6:
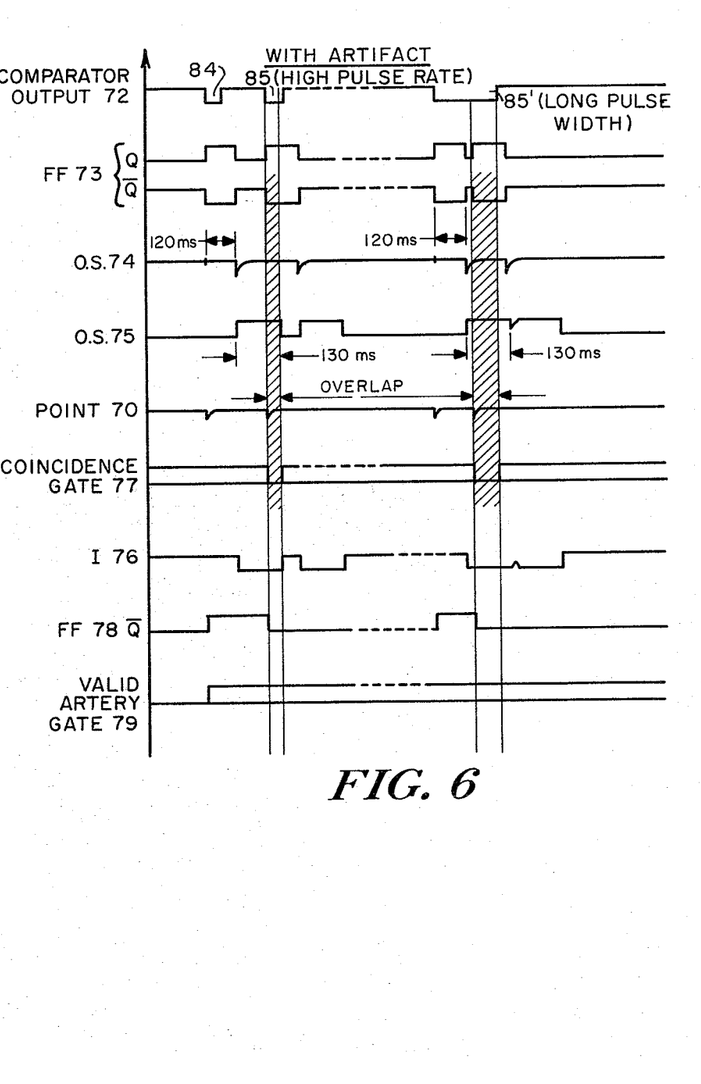
FIGS. 6 and 7 are graphic representations of time related voltage waveforms showing time variant voltages at the corresponding points indicated in FIG. 5, for conditions respectively denoting the absence and presence of input artifact signals.

The pulse width and rate detector, as illustrated in FIGS. 5 through 7, performs a test on each detected doppler signal so as to distinguish the artifact signals from artery signals and reject the artifact signals. If a doppler signal passes the pulse width test established by one shot 74 and the pulse rate test established by one shot 75, NAND gate 79 is enabled to provide a pulse denoting a valid artery signal. If the pulse width is greater than 120 ms or the pulse rate is greater than 240 bpm or the pulse interval is less than 250 ms, coincidence is achieved at NAND gate 77 to indicate an artifact and NAND gate 79 will be disabled. Upon NAND gate 79 being enabled audio pulses will be generated from NAND gate 82. However, upon the first four artery pulses having been counted, NAND gate 72 is disabled so that subsequent doppler signals by-pass the pulse width rate detector. NAND gate 81 is enabled with each subsequent doppler signal passed by the threshold detector 42 which appears at the output of NAND gate 82 as an audio pulse.

In referring back to the pressure build-up in cuff 22, the pressure at connection tube 25 is converted to a digital signal by pressure transducer 45, and compared with a set value to ascertain when a predetermined maximum pressure is built up in the cuff. At this point operation of pump 23 is stopped and the cuff is gradually deflated via relief valve 24, and a signal is generated by comparator 46 which triggers one shot unit 47 to produce an output pulse of 2.5 seconds duration disabling NAND gate 44. This prevents false triggering by signals emanating from either the pump motor or the cuff adjusting to air pressure, by inhibiting such false triggered signals from entering logic circuitry 51. The 2.5 second pulse from one shot 47 also feeds NAND gate 84 input of logic reset unit 48, to provide a reset pulse for resetting all the counting units as well as flip flop 92.

Subsequent to the 2.5 second inhibiting pulse duration, upon a signal being passed by the pulse width and rate detector 43, NAND gate 44 will be enabled to trigger one shot unit 49 producing an output pulse of 250 ms to energize artery light 50. Output pulses from NAND gate 44 will also affect logic 51 to cause the systolic and/or diastolic manometers 27, 28 to provide indications of the subject's blood pressure by temporarily locking-up the systolic manometer through a conventional first audio latch. Within logic unit 51, in the systolic lock-up unit 52, shown in FIG. 9, upon four of such valid artery pulses being counted by counter 91, flip flop 92 is set so that NAND gate 93 is enabled on the count of four to energize, via inverter 94, a second latch (not shown) for permanently locking-up the systolic manometer indicator. In addition, in FIG. 5, NAND gate 81 is set to count on five whereas NAND gate 72 is inhibited.

With reference back to discriminator 34, doppler signals are simultaneously fed to band pass filter 36 which will pass doppler signals having audio frequency content higher than 100 Hz. The doppler signals which are passed by filter 36 are monitored by a switching detector 58, which is responsive to certain predetermined criteria to energize relay switch 37 causing contact 39 to be closed whereby filter 36 is thereafter used for passing doppler signals for blood pressure measuring purposes.

An input doppler signal passed by filter 36 to switching detector 58 will be compared with reference in differential comparator 62 and again passed and shaped if it exceeds the reference voltage and is stored at the set input of comparator latch 65. If upon occurrence of an audio pulse or an artifact pulse, latch 65 is set and an output pulse is generated and NAND gate 68 is enabled if coincident with the 250 ms period artery pulse from detector 43, whereby flip flop 69 is set to cause pulse counter 71 to count. Flip flop 69 is reset by the negative portion of the 250 ms artery light pulse from one shot unit 49. The 250 ms pulse duration ensures that only one count per heart beat will enable the flip flop and enter counter 71, making the switching detector independent from heart rate and number of pulses per heart beat to ignore other non-relevant pulses during a single heart beat, as this 250 ms period is about the minimum interval between heart beats in an adult human, whether in a distressed or normal healthy state.

Upon a predetermined number of artery signals (four in the preferred embodiment) being passed by counter 71, relay circuitry 59 is enabled to cause the relay switch 37 to be energized and switch the relay contacts from 38 to 39, thereby causing the filter 36 to be connected with audio amplifier 41 for blood pressure monitoring in lieu of filter 35. The counting of four of such doppler signals has been selected as a probability of four non-valid artery signals having been counted is virtually non-existant. Once the relay switch has been set, it and counter 71 are not set again until the 2.5 audio inhibit and reset pulse from one shot unit 47 is generated indicating recycling of the device by activation of the maximum cuff pressure comparator 46. Of course, it is understood that the filters may not necessarily be switched during each device cycle, as with any one particular subject four doppler signals of sufficient energy may not be passed by filter 36.

In turning to the alarm system 56, it is first observed that if during the approximate 2.5 sec period generated by one shot 101 following the 2.5 sec audio inhibit period, a valid artery pulse is detected to enable NAND gate 102, flip flop 103 will cause the alarm light to go on indicating that a valid artery pulse was detected with 10 mm of maximum pump-up to make the user aware that he did not pump-up high enough.

In addition, flip flop 103 is also tripped to light up the alarm light when the analog counter 112 has counted up 2.5 seconds of artifacts whereby the counting might be accomplished in two ways. First, each artifact via inverter 105 and one shot 106 energizes switch 107 functioning as a current generator causes a minimum of 250 ms to be counted in 112, however, if the artifact(s) is continuous then it directly causes switch 107 to be energized continuously causing counter 112 to count up the continuous artifact(s) in real time. Accordingly, one may wind up with 2.5 seconds of continuous artifacts or ten total artifacts or some combination of the two.

It should be understood, of course, that the foregoing disclosure related to only a preferred embodiment of the invention and that numerous modifications or alterations may be made therein with departing from the spirit and scope of the invention. For example, if the oscillating or transmitting frequency used was 8 Hz instead of 2 MHz filter 35 would be set from about 180 to 1240 Hz and BPF 36 would be set from about 400 to 2000 Hz. Obviously this occurs as since the transmitting frequency is increased fourfold over 2 MHz, the number of wavelengths intersecting the artery wall movement or being modulated by the wall movement would also increase by a factor of four. In addition, the particular 250 ms and 2.5 sec time periods may be slightly varied as also may be the number of counts of valid artery pulses, and artifacts.

Supplemental to the above, it is also emphasized that the artifact rejection system is shown to be employed with the dual band pass filter arrangement, however, the basic concept of the artifact rejection system and the alarm system disclosed are obviously independent of the dual band pass filter arrangement.

What is claimed is:

1. In an indirect blood pressure measuring apparatus having means for externally occluding an artery with pressure and varying said pressure with known pressure values allowing the artery to open and close, transducer means that responds to the interaction of blood pressure and cuff pressure to develop electrical input pulse signals including tone bursts containing a plurality of pulses, and processing means coupled with said pressure means for automatically responding to a selected one of said input pulse signals to provide a blood pressure measurement, the improvement comprising:

detector means, responsive to the onset of one such tone burst and coupled between said transducer means and processing means, for establishing a predetermined maximum pulse width to define as artifact a tone burst having a width in excess of said maximum width, said detector means including means for rejecting in full a tone burst determined to be artifact and for passing a non-artifact tone burst to the processing means.

2. In an apparatus according to claim 1 wherein said detector means further includes:

means for establishing a predetermined maximum pulse rate to further define as artifact a first one of two successive input pulse signals provided the second input pulse signal occurs within a predetermined period defined by said pulse rate.

3. In an apparatus according to claim 2 wherein said detector means further includes:

means for delaying an input pulse signal for a period equivalent to said maximum pulse width and maximum pulse rate, including gate means operable for passing the delayed pulse signal to the processing means; and said reject means being coupled with said delay means and input pulse signals, and responsive to artifact for inhibiting operation of said gate means.

4. In apparatus according to claim 1 wherein said detector means comprises:

delay means for delaying an input pulse signal for a period equivalent to said predetermined maximum pulse width including gate means for passing the delayed pulse signal to the processing means as non-artifact;

said reject means being coupled with said delay means and responsive to said input pulse signals for inhibiting said gate means when said pulse width period has been exceeded.

5. In electronic apparatus, such as indirect blood pressure measuring apparatus having means for analyzing patient derived electrical signals which include tone bursts containing a plurality of pulses indicative of certain physiologic activity, in which only signals determined as non-artifact are passed and those signals determined to be artifact are selectively rejected and inhibited from passing based upon a predetermined pulse width or rate, the combination comprising:

means for delaying said signals for a first period, the first period defining a desired maximum pulse width and a second period, the first period and second period together defining a desired maximum rate, said delaying means including first means receiving said signals for providing said first period and second means directly coupled to said first means for providing said second period, said second period being caused to commence upon the termination of said first period;

first gate means connected from said delay means; and detector means for comparing non-delayed derived signals with said delayed signals during said second period and controlling said first gate means to pass the delayed signals upon the absence of non-delayed signals and to inhibit the passage of the delayed signals upon the presence of non-delayed signals.

6. In electronic apparatus according to claim 5 wherein said delay means includes:

first one shot means energized in response to the non-delayed signals and having a first refractory period defining said maximum pulse width; and second one shot means energized in response to said first one shot and having a second refractory period which together with said first refractory period defines said maximum pulse rate.

7. In electronic apparatus according to claim 6 wherein said delay means further includes:

bistable means responsive to said non-delayed signals and connected with said first one shot means and with said detector means, the connection with said first one shot means including a reset connection enabling said bistable means to be resettable at the end of the first refractory period upon energization of said first one shot means.

8. In electronic apparatus according to claim 6 wherein said detector means includes:

second gate means connected from said delay means, said second gate means being enabled upon presence of non-delayed signals during said second period; and bistable means connected from said second gate means and the input to said first one shot means and connected to said first gate means, said bistable means being resettable upon energization of said first one shot means.

* * * * *